United States Patent [19]

Goodman et al.

[11] 3,794,776

[45] Feb. 26, 1974

[54] KEY TELEPHONE SYSTEM TRANSFER ADAPTER CIRCUIT

[75] Inventors: William R. Goodman; Kal W. Howard, both of Charlottesville, Va.

[73] Assignee: Stromberg-Carlson Corporation, Rochester, N.Y.

[22] Filed: July 10, 1972

[21] Appl. No.: 270,412

[52] U.S. Cl. ............................ 179/99, 179/18 BD

[51] Int. Cl. ............................ H04m 3/00

[58] Field of Search ............................ 179/99, 18 BD

[56] References Cited

UNITED STATES PATENTS

| | | | |
|---|---|---|---|
| 3,244,815 | 4/1966 | Anderson et al. | 179/99 |
| 3,718,770 | 2/1973 | Reese | 179/99 |
| 3,691,310 | 9/1972 | Fenton | 179/99 |
| 3,571,520 | 3/1971 | Clarke et al. | 179/99 |
| 3,449,527 | 6/1969 | Strobelt et al. | 179/18 BD |

*Primary Examiner*—Thomas W. Brown

*Assistant Examiner*—Mitchell Saffian

*Attorney, Agent, or Firm*—Charles C. Krawczyk; William F. Porter, Jr.

[57] ABSTRACT

Transfer adapter circuits are combined with a key telephone system for extending telephone lines to a private intercom system without the need for individual pickup button positions on the key telephone set.

13 Claims, 2 Drawing Figures

KEY TELEPHONE SYSTEM TRANSFER ADAPTER CIRCUIT

BACKGROUND OF THE INVENTION

This invention relates generally to key telephone systems and specifically to an arrangement of transfer adapter circuits for extending telephone lines serving a key telephone set to private intercom stations.

Today it is not uncommon for a multi-telephone customer to rent or own telephone switching equipment for establishing internal connections between his own private telephone stations for inside calls and for establishing connections to a central office switching exchange for outside calls. This generally results in a financial savings to the customer since he need rent only enough telephone trunk lines connected to the central office necessary to accommodate outside telephone traffic. Quite often the multi-telephone customer wishes to permit only a selected group of his telephone stations direct access to telephone trunk lines for outside calls while restricting the remaining telephone stations to inside calls to minimize telephone expenses and perhaps to prevent telephone abuse. Under certain circumstances, however, it may be desirable or even necessary to permit an outside call to be initiated from or terminated to a restricted station. A typical example of this is an industrial plant wherein unrestricted telephone service is usually afforded executive personnel, while telephone stations within the factory area are restricted to inside calls except in the case of some exigency necessitating an outside call which is then usually made through the services of the plant telephone operator. Another example is a motel wherein guests may call one another by dialing the room number but must go through the desk operator in order to speak with some outside party.

One common type of telephone switching equipment which provides both restricted and unrestricted telephone service is the private branch exchange. This equipment has, among other classes of service, two service classes for permitting and blocking outside calls to and from telephone stations within the exchange. Thus, if a telephone station has the proper class of service it can access and be accessed by a telephone trunk line and if it does not have the proper class of service an outside call to or from the station must be routed through a telephone operator. Although the private branch exchange appears ideal for providing restricted/unrestricted service, its design makes it economically unattractive for small customers whose restricted stations are much greater in number than the unrestricted stations. Suited more to the economical needs of these customers is a private intercom system which includes any type of private switching exchange used by itself solely for inside calls and used in combination with a key telephone system for outside calls. The restricted stations called intercom stations, are connected to the private switching exchange directly while the key telephone system serving unrestricted stations is connected to the trunk lines directly or indirectly through some switching equipment such as a private branch exchange.

The key telephone system is a popular means in the prior art for connecting telephone apparatus to any one of a plurality of telephone lines. The standard key telephone sets used in such a system have a fixed number of pickup buttons for selecting the telephone line to which the set is to be connected and a hold button for holding a telephone line seized while it is temporarily disconnected from the key telephone set to permit the key telephone operator to speak to another party via another telephone line. The initiation and termination of local signalling to the key telephone set and the hold conditions are provided by individual line circuits associated with the individual telephone lines. When used with a private intercom system the key set has associated with it an intercom line over which inside calls are made to and from intercom stations through the private switching exchange. Outside calls are made to and from the key set over the telephone lines connected thereto.

The key telephone system just described can be expanded by the use of transfer adapter circuits to extend the telephone lines to intercom stations through the private switching exchange under the control of the key telephone set for transferring outside calls when necessary. An individual transfer adapter circuit is required for each telephone line for which it is desired to have transfer capability. The transfer adapter circuit is placed between the key telephone set and the line circuit of the telephone line having this transfer capability. An intercom line associated with the transfer adapter circuit and consequently its associated telephone line is connected between the key telephone set and the private switching exchange for establishing the desired connection. For each transfer adapter circuit there is a different intercom line. In addition to each pickup button required for each telephone line serving the key telephone set, another pickup button is required for accessing the associated intercom line so that two buttons on the key telephone set must be set aside for each telephone line that is to have transfer capability.

Since there is a limited amount of space on the front of the key telephone set to accommodate pickup buttons, the need for two pickup buttons for each telephone line having transfer capability places a serious limitation on the usefulness of the foregoing arrangement. Each time a pickup button is dedicated to an intercom line for use in transferring outside calls it can no longer be used for connecting another telephone line to the key telephone set. Consequently, the number of telephone lines serving a key telephone set must be reduced in order to provide the transfer capability for extending telephone lines to intercom stations. If all telephone lines serving a key telephone set must have transfer capability then the normal telephone traffic handling capability of the set itself is reduced by half since half of the line pickup buttons which would ordinarily be used for selectively connecting telephone lines to the set must be set aside for selectively connecting intercom lines to the set when required. This results in inefficient utilization of the key telephone set since the need for transferring outside calls is the exception and not the rule. It would therefore be highly desirable to afford a key telephone system the capability of transferring outside calls to intercom stations under the control of a key telephone set without having to sacrifice any of the key set pickup button positions for the purpose of selecting intercom lines to effect call transfers.

Also since each transfer call now requires the use of the hold button in addition to a line and intercom pickup button for effecting a call transfer (to place the line on hold while accessing the intercom station) it will also be desirable to effect call transfers without the inconvenience of operating three different buttons.

In view of the foregoing it is an object of the present invention to provide a new and improved transfer adapter circuit to be used with a key telephone system for extending telephone lines to private intercom stations for transferring outside calls.

It is a further object of the present invention to provide a new and improved transfer adapter circuit which does not require an individual pickup button position on the key telephone set.

It is still a further object of the present invention to provide an arrangement of new and improved transfer adapter circuits for use with a standard key telephone set wherein a single transfer key common to all of the transfer adapter circuits is operated to extend any of the associated key set telephone lines to the private intercom stations and the hold button need not be used.

BRIEF DESCRIPTION OF THE INVENTION

The transfer adapter circuit of the invention is placed between a key telephone set and the line circuit of a telephone line for which transfer capability is desired. Outside calls are transferred to intercom stations via an intercom line connected between the transfer adapter circuit and the private switching exchange of the private intercom system in response to transfer signals from the telephone set applied to the adapter circuit while its associated telephone line pickup button is operated. The first transfer signal places the telephone line on hold and connects the telephone set to the intercom line so that the desired intercom station can be accessed. Thereafter the hold condition is removed and the intercom line is connected to the telephone line in response to either a second transfer signal or the disconnection of the telephone set from the transfer adapter circuit.

An additional feature of the invention is an inhibit circuit which limits the number of simultaneous outside calls which can be transferred to intercom stations. The inhibit circuit is connected between the private switching exchange and all the transfer adapter circuits so that when signals are received from the exchange indicating that a preselected number of dedicated intercom lines are in use, the inhibit circuit inhibits all of the idle transfer adapter circuits so that they cannot be activated.

In the specific embodiment described, transfer signals are applied to the adapter circuit by the operation of a nonlocking transfer key on the key telephone set. The connection between the intercom line and telephone line is made through an audio bridge which is connected into the circuit when the intercom line is connected to an intercom station via the private switching exchange. When combined into a transfer adapter arrangement, a plurality of transfer adapter circuits permit their associated telephone lines to be extended to intercom stations simultaneously, each transfer adapter circuit being responsive to the transfer signal when its associated telephone line pickup button is operated.

DETAILED DESCRIPTION OF THE INVENTION

Figure 1:
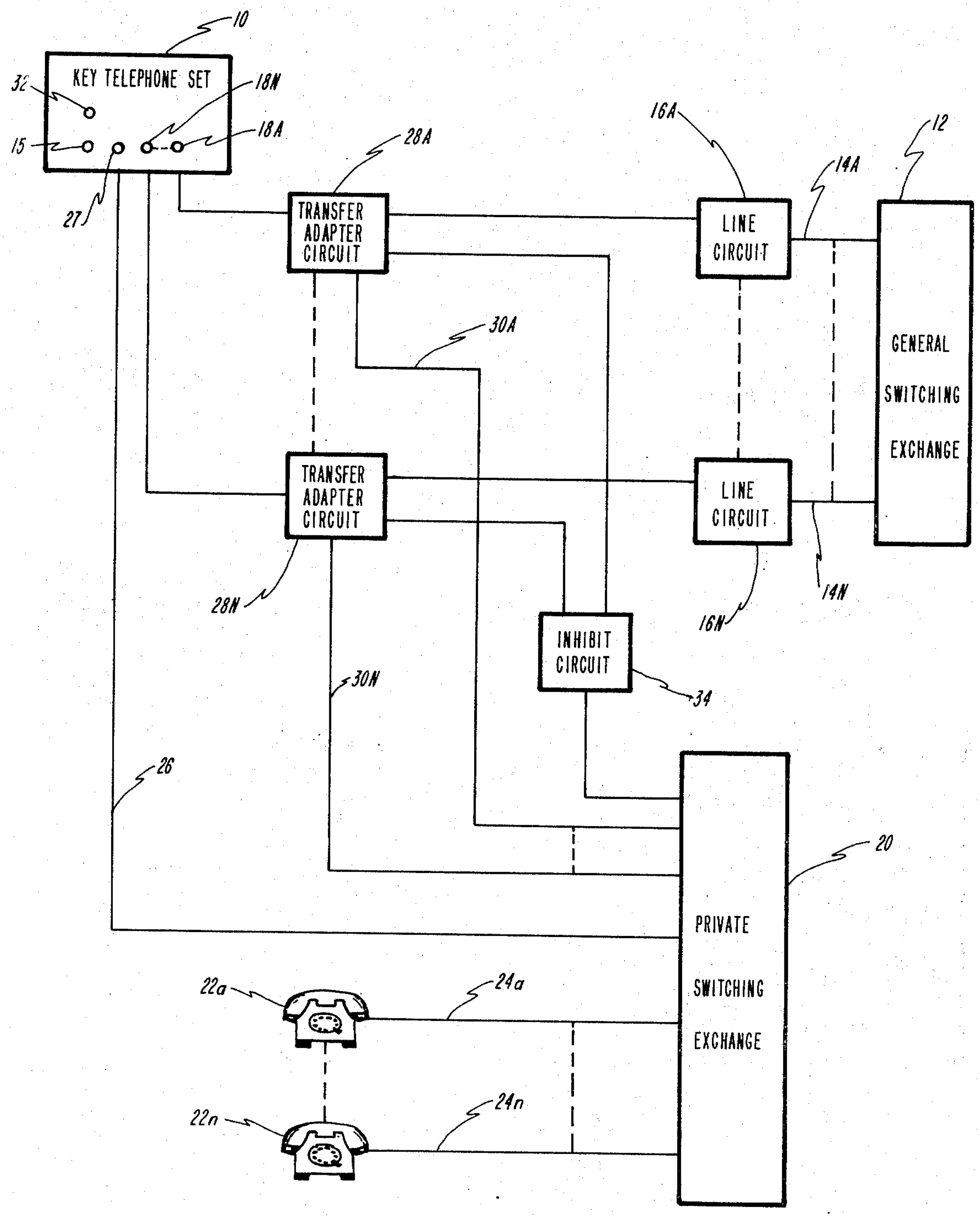
FIG. 1 shows in block form a key telephone system combined with a plurality of transfer adapter circuits for extending telephone lines to a private intercom system.

FIG. 1 shows a system block diagram including the invention wherein a key telephone set 10 is connected to a general switching exchange 12 through any one of a plurality of telephone lines (14A–14N). The general switching exchange 12 could be a private branch exchange used for connecting the key telephone set 10 to other telephone stations within the branch exchange as well as to a central office switching exchange for outside calls, although in the usual case it would be a central office for connecting the key telephone set 10 to outside stations directly (the lines 14 then being commonly referred to as trunk lines). Each telephone line 14 is connected to the key telephone set 10 through its own line circuit (16A–16N). The telephone line circuit 16 serves supervisory and control functions for initiating and terminating local signalling to the key telephone set 10 and for placing the associated telephone line 14 on hold by the operation of a hold button 15 so that the line is held seized from the general switching exchange 12 while the key telephone set 10 is temporarily disconnected therefrom, thereby permitting the key telephone operator to speak to someone else via another telephone line 14. The operation of this type of line circuit 16 is well known and can be referred to in a number of sources such as a copending application entitled, "Key Telephone System Line Circuit" (Ser. No. 263,342) filed on June 15, 1972, now U.S. Pat. No. 3,748,405, on behalf of P. Saba. An individual telephone line 14 is connected to the key telephone set by depressing its associated line pickup button (18A–18N) on the key set 10, there being one pickup button 18 for each telephone line 14.

As part of a private intercom system, a private switching exchange 20 serves to establish telephone connections between a plurality of private intercom stations (**22*a*–22*n*) which cannot be connected to outside stations. Each of the private intercom stations 22 has an individual private intercom line (24*a*–24*n*) for connecting it to the private exchange 20. Each intercom line 24 is connected to the exchange 20 through an associated line circuit (not shown) which performs the necessary supervisory and control functions for initiating and terminating telephone calls on the line 24. Although the exchange 20 can connect any one of the intercom stations 22 to another intercom station 22 or to the key telephone set 10 via an intercom line 26 which has a pickup button 27 associated with it on the set 10, there is no means for it to access the general switching exchange 12 and therefore no means for establishing outside calls to and from the intercom stations 22. Consequently, the telephone users at the intercom stations 22, hereinafter referred to as intercom parties are restricted to calls involving only those stations which have a direct appearance at the private exchange 20 via an intercom line such as 24 or 26.**

A plurality of transfer adapter circuits (28A–28N), each one being placed between the key telephone set 10 and a different line circuit 16 permits extending the lines 14 to the private switching exchanger 20 under the control of the key telephone set 10 for transferring outside calls to the intercom stations 22. An individual transfer adapter circuit 28 is required for each telephone line 14 for which it is desired to have transfer capability. Although FIG. 1 depicts each telephone line 14 as having a transfer adapter circuit 28, this is not necessary and with regard to those telephone lines 14 which need not be capable of being connected to the intercom stations 22 (the design criteria being specified by the telephone equipment user) no transfer adapter circuits are required. Each transfer adapter circuit 28 has a dedicated private intercom line (30A–30N) connecting it to the private switching exchange 20 through which its associated telephone line 14 is extended to the intercom stations 22.

To describe the operation of the transfer adapter circuit 28 generally it will be assumed that telephone line 14A is connected to the key telephone set 10 through its associated line circuit 16A and transfer adapter circuit 28A (the key telephone handset is off-hook and pickup button 18A is depressed) and that a telephone call from an outside station via the general switching exchange 12 is in progress. It makes no difference how the connection was established; that is to say the telephone call could have been initiated by the key telephone operator from the set 10 or by an outside party calling through the general switching exchange 12. Assuming that the call was terminated to the key set 10, once connected, the outside party indicates to the key telephone operator which intercom station 22 he wishes to call. The key telephone operator then presses a nonlocking transfer key 32 (a spring loaded pushbutton which remains depressed only while the operator presses it) which impresses a signal on the transfer adapter circuit 28A activating the circuit 28A and causing it to apply a hold signal to the line circuit 16A which responds thereto by placing a holding bridge commonly referred to as a dummy load across the telephone line 14A. When the operator then releases the nonlocking transfer key 32, the key telephone set 10 is disconnected from the telephone line 14A and connected through the transfer adapter circuit 28A to the private switching exchange 20 via the dedicated intercom line 30A. The operator then dials the number of the intercom station 22 which the outside party wishes to call. If no one at the station 22 answers the call the key telephone operator presses the transfer key 32 again which reconnects the key telephone set 10 to the line 14A so that he can so apprise the outside party. If someone does answer the call, the operator advises him that there is an outside call being made to him. When the dedicated intercom line 30A is connected to an intercom station 22 the private exchange 20 applies a signal to the transfer adapter circuit 28A which completes an audio bridge connection between the key set audio leads, and the intercom line 30A. Thereafter when the key telephone operator operates the transfer key 32 again, the key telephone set 10 is disconnected from the intercom line 30A and reconnected to the telephone line 14A (the hold condition now being removed) which also connects the intercom station 22 to the telephone line 14A through the transfer adapter circuit 28A via the audio bridge so that a conference call may take place. If the operator does not wish to participate in the conversation he either hangs up his handset or selects another telephone line 14 over which to speak by depressing the appropriate pickup button 18. This disconnects the key telephone set 10 from the transfer adapter circuit 28A but leaves the telephone line 14A connected to the intercom station 22 via the transfer adapter circuit 28A and the dedicated intercom line 30A so that the outside party can talk privately with the intercom party. At this point the connection is under the control of the intercom party so that when he hangs up, the path through the transfer adapter circuit 28A is broken.

Once the intercom station 22 is connected to the key set 10 should the key telephone operator inadvertently or intentionally hang up or switch to another telephone line before operating the transfer key 32, the transfer adapter circuit 28A will still complete the transfer connection between the outside and intercom parties just as if the transfer key had been operated again. If an intercom party wishes to initiate a call to an outside station he calls the key telephone operator via the intercom line 26 and relates the desired telephone number. The intercom party then hangs up while the operator makes the call over one of the telephone lines 14. After the call is answered, a connection between the outside station and the intercom station 22 is established in the manner previously set forth.

It may be desirable under certain circumstances to limit the number of connections between outside stations and intercom stations 22 which can be made at any one time. This optional feature is provided by an inhibit circuit 34 which is connected between the private switching exchange 20 and all the transfer adapter circuits 28. The switching exchange 20 applies signals to the inhibit circuit 34 indicating how many dedicated intercom lines 30 and therefore transfer connections are in use at any one time. When a preselected number of dedicated intercom lines 30 are busy, the inhibit circuit 34 then functions in response to the signals to inhibit the idle transfer adapter circuits 28 from being seized by the key telephone set 10 so that no more connections between the general switching exchange 12 and the intercom stations 22 can be made.

Figure 2:
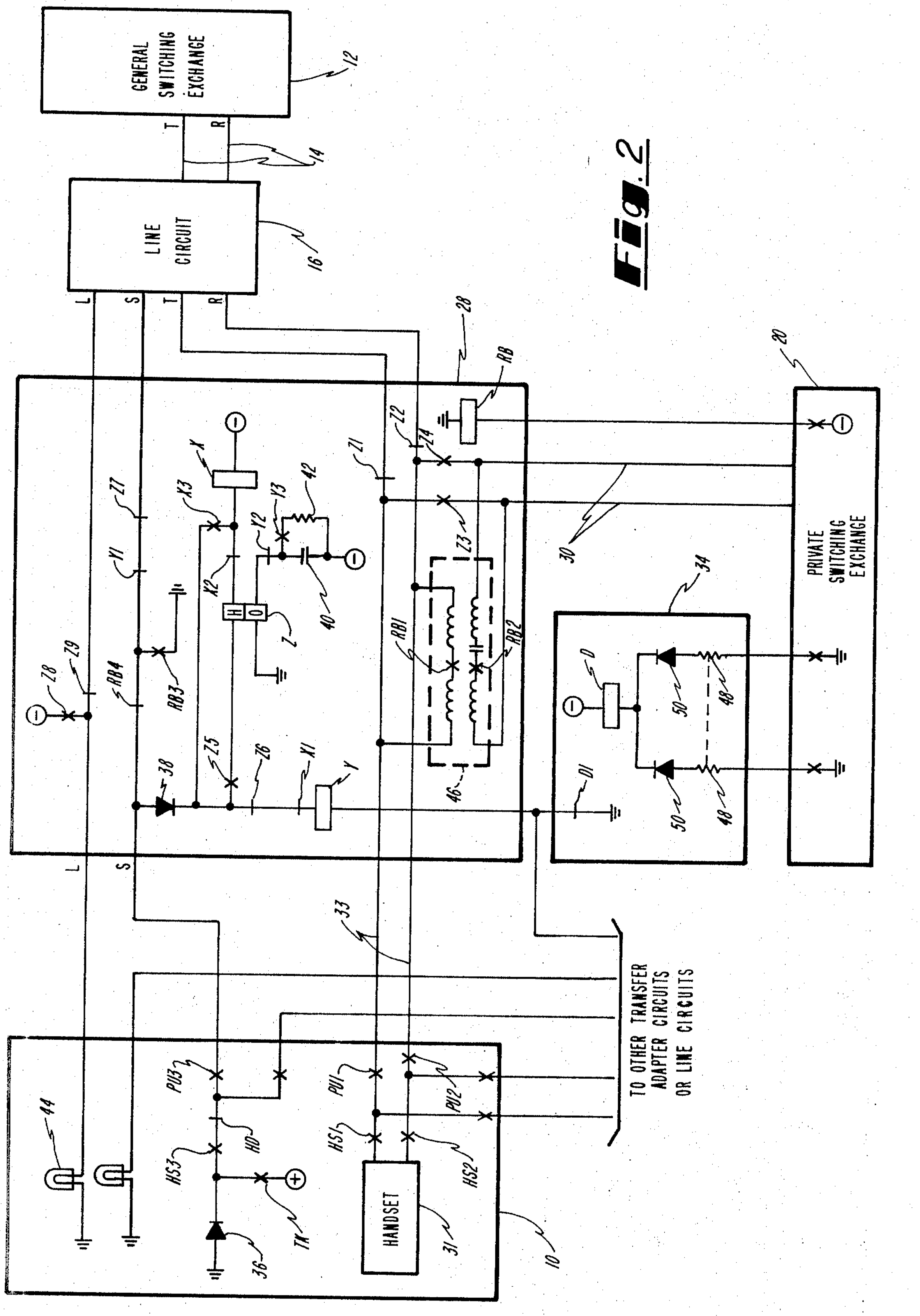
FIG. 2 depicts schematically a single transfer adapter circuit.

FIG. 2 depicts schematically a single transfer adapter circuit 28 together with the inhibit circuit 34. The transfer adapter circuit 28 comprises four relays, X, Y, Z and RB which are normally deactuated. The four leads, tip (T), ring (R), signal (S) and lamp (L) which normally interconnect the line circuit 16 with the key telephone set 10 pass through the transfer adapter circuit 28 via various contacts of the aforementioned relays. The key telephone handset 31 is connected to the tip and ring leads of the telephone line 14 via an audio lead pair 33 through the normally open telephone hookswitch contacts HS1 and HS2 which are closed when the handset 31 is lifted and through the pickup button contacts PU1 and PU2 when the pickup button 18 associated with the line 14 is operated. At this time, normally closed contacts Z1 and Z2 of relay Z are closed so that the connection is complete between the audio lead pair 33 and the telephone line 14. In the drawing identification system used, the letter appearing before the number for a particular set of contacts identifies the relay which controls those contacts. Also, considering the normal operating state for a relay to occur when it is deenergized, normally open contacts are indicated by an X and normally closed contacts are indicated by a short straight line.

Normally open contacts Z3 and Z4 are open at this time so that the audio lead pair 33 is not connected to the dedicated intercom line 30. It makes no difference whether the key telephone operator called the outside party or vice versa so long as the telephone set 10 and the outside station are connected together to permit a telephone conversation to take place therebetween. After the connection is made the operator operates the nonlocking transfer key 32 which closes the normally open contacts TK which remain closed only while the key 32 is depressed. Prior to the closing of the contacts TK, a ground signal indicating an off-hook condition is applied to the line circuit 16 through the S lead via a diode 36, various normally closed contacts including the contacts HD which are controlled by the key set hold button 15 and the now closed contacts HS3 and PU3. So long as this off-hook ground signal is applied via the S lead to the line circuit 16, no dummy load is placed across the associated telephone line 14. When the off-hook signal is removed, the line circuit 16 responds by initiating a hold condition whereupon a dummy load in the line circuit 16 is placed across the tip and ring leads of telephone line 14 so that the line 14 is held seized from the general switching exchange 12 while it is temporarily disconnected from the key telephone set 10 thereafter. The removal of the off-hook ground signal may therefore be considered a hold signal which is applied to the line circuit 16 when the pickup button 18 associated with its associated telephone line 14 is depressed and the hold button 15 (which is non-locking) is operated.

The moment the transfer key 32 is depressed a positive potential constituting a momentary transfer signal is applied to the S lead through the contacts TK which overrides the ground signal to operate relay Y via a path which includes a diode 38 and normally closed contacts X1, Z6 and D1, the last contacts being controlled by a relay D which is part of the inhibit circuit 34 and which will be described in detail later. All Y relays in all the transfer adapter circuits 28 are operated from the same ground through the contacts D1. The immediate operation of relay Y opens the normally closed contacts Y1 connected in series with the S lead thereby removing the off-hook ground signal via diode 36 from the line circuit 16 so that the dummy load is placed across the telephone line 14 at this time. Contacts Y2 and Y3 are actuated to discharge a capacitor 40 through a resistor 42 connected across its plates. While the transfer key 32 is first depressed the relay Z, which is a dual coil relay, cannot operate since the energizing path for its operate winding O is in series with the now open Y2 contacts. When the transfer key 32 is thereafter released the transfer signal is removed and relay Y is released so that the operate winding O of relay Z is momentarily energized by the charging current through capacitor 40 via the now closed contacts Y2. This charging current is sufficient to actuate the relay Z. The relay Z is held operated after the release of the transfer key 32 through a hold winding H which is connected between the ground source via diode 36 and a negative power terminal through the now closed contacts Z5, normally closed contacts X2 and the winding of relay X (when only one power terminal is shown it is understood that the other power terminal is connected to ground to complete a current path). The relay X is not operated at this time since the current flowing through its winding is below its operate level. Contacts Z6 are opened at this time to prevent the relay Y from being operated a second time. Contacts Z7 are also opened at this time to keep the ground signal via diode 36 from being applied to the line circuit 16 so that the telephone line 14 remains on hold. Contacts Z8 are closed at this time to apply a constant voltage to the line lamp 44 so that it is lighted continuously to indicate that telephone line 14 is on hold while the key telephone operator is establishing a connection to one of the intercom stations 22. Contacts Z9 break the L lead connection to the line circuit 16 so that the normal intermittent signal indicating that the line 14 is on hold cannot be applied to the lamp 44 at this time.

With the operation of relay Z the audio lead pair 33 is disconnected from the telephone line 14 through now open contacts Z1 and Z2 and is connected to the dedicated intercom line 28 through the now closed contacts Z3 and Z4. The key telephone operator dials the telephone number of the desired intercom station 22 which is processed by the private switching exchange 20. Once the call is answered the key telephone operator indicates that an outside party wishes to speak with the intercom party and then commences to establish the connection. The moment the dedicated intercom line 30 is connected to the intercom station 22 the private exchange 20 applies an answered call signal to the relay RB to operate it. This signal may be applied directly to the relay RB from a negative power terminal through normally open contacts as shown in FIG. 2 or if desired the relay RB can be placed across the dedicated intercom line 30 through appropriate circuitry well known in the art to be energized by a reverse battery signal generated when the intercom station 22 responds to the call. In either event the operation of relay RB establishes an audio path between the dedicated intercom line 30 and the telephone line 14 via contacts Z1 and Z2, such as for example, through a repeater bridge 46 in which one pair of series connected windings is connected across the audio lead pair 33 through normally open contacts RB1 and the other pair of series connected windings is connected across the dedicated intercom line 30 through normally open contacts RB2. Any other type of audio bridge may be used so long as it blocks the DC potential across the dedicated intercom line 30 from being combined with the DC potential across the telephone line 14 since these two potentails may be different in polarity and magnitude. Since the audio path is through the contacts Z1 and Z2 even with the relay RB operated, audio communication cannot take place between the intercom and outside parties until the telephone line 14 is removed from its hold condition by the deactuation of the relay Z whereupon the contacts Z1 and Z2 are closed. This permits the key telephone operator and the intercom party to converse privately before the audio path between the latter and the outside party is connected through.

To extend the telephone line 14 to the intercom station 22, the key telephone operator operates the nonlocking transfer key 32 a second time which reapplies the positive potential transfer signal to the S lead. With this positive potential and the negative potential connected in series across the relay X through the hold winding H of relay Z, sufficient current flows to actuate the relay X. This opens the normally closed contacts X2 interrupting the energizing current through the hold winding H of relay Z so that relay Z is deactuated. Relay X is held operated through closed contacts X3 only while the transfer key 32 is depressed since the positive potential is removed from lead S when the transfer key 32 is released and the application of the off-hook ground signal is not enough to maintain it operated. While relay X is operated contacts X1 are open to continue preventing the Y relay from being operated a second time. Contacts Z3 and Z4 are now opened to break the metallic path between the dedicated intercom line 30 and the audio lead pair 33. The audio lead pair 33 is again connected to the telephone line 14 through the now closed contacts Z1 and Z2. A ground signal is now applied to the line circuit 16 on the S lead through the normally closed contacts Y1 and Z7 and the now closed contacts RB3 of relay RB which causes the dummy load of line circuit 16 to be disconnected from the telephone line 14 so that the line 14 is no longer on hold. The contacts RB4 prevent the ground signal from being applied directly to the positive potential terminal when the transfer key 32 is operated. The intercom station 22 is now connected to the telephone line 14 through the repeater bridge 46 and the closed contacts Z1 and Z2. Thus the outside station, the intercom station 22 and the key telephone set 10 are all connected together for audio communication in a conference fashion. All three parties may converse with one another at this time. Should the key telephone operator not wish to continue in the conversation he merely hangs up his handset or switches to another telephone line leaving the intercom station 22 and telephone line 14 connected to one another so that the respective parties may carry on a conversation. Should the key telephone operator hang up, the connection through the private switching exchange 20 is held under the control of the station 22 since the relay RB remains energized only while the intercom party remains off-hook.

Once the key telephone operator and the intercom party are initially connected while the outside party is on hold, the telephone line 14 will be automatically extended to the intercom station 22 even if the key telephone set 10 is disconnected from the transfer adapter circuit 28 by the operator hanging up or switching to another telephone line before completing the transfer connection (by operating the transfer key 32 as just explained). In this case, the relay X is not operated and the relay Z merely releases since the path for the off-hook ground signal which was energizing the hold winding H is broken by the opening of the contacts HS3 or PU3. Othere than this the transfer connection is completed as already explained.

It may be desirable under certain circumstances to limit the number of simultaneous connections which can be made between the general switching exchange 12 and the intercom stations 22. If this is so, an optional feature of the invention permits inhibiting all remaining idle transfer adapter circuits after a preselected number of transfer adapter circuits are already actuated. This is done through the inhibit circuit 34. Each connection between the switching exchange 12 and an intercom station 22 is made through an individual link of the private switching exchange 20 in response to which the exchange 20 generates a ground signal associated with that particular link. This is done for instance by the closing of normally open contacts connected in a series path including a resistor 48, a diode 50 and a ground source, there being a different series path for each link, whenever the associated link is being used. The ground signal is applied to a relay D. As each additional link is called in to establish an additional connection involving another dedicated intercom line 30 an additional resistor 48 is placed in parallel between the ground source and the relay D. The relay D is made to operate on a minimum current which is attained only when a preselected number of resistors 48 are paralleled. The number of parallel resistors 48 necessary to operate relay D is the same as the maximum number of transfer adapter circuits 28 which are to be permitted to be actuated simultaneously. When operated, the relay D opens contacts D1 thereby breaking the ground connection to all of the transfer adapter circuits 28 so that those transfer adapter circuits not already operated cannot be so operated since an energizing path for the Y relays cannot be completed. When a call between an outside party and an intercom party is over, the link of the switching exchange 20 through which the connection is made is released which in turn removes the ground signal from its associated resistor 48. This causes relay D to release, thereby permitting any one of the idle transfer adapter circuits 28 to be seized. If the inhibit circuit 34 is not required then a ground connection can be made to the relay Y directly.

Since the connections from a directed intercom line to a telephone line and the key telephone set are made within the transfer adapter circuit, the dedicated intercom line does not require an individual pickup button position on the key set as required by prior art devices. Moreover all that is required is a single nonlocking transfer key to function with all the transfer adapter circuits connected to the key set since the proper transfer adapter circuit for effecting a call transfer is automatically enabled to receive transfer signal from the set by the operation of the pickup button of the telephone line associated with it. The relay sequencing arrangement used permits a single type of transfer signal to perform different functions each time it is impressed on the signal lead so that call transfers can be made easily and conveniently and without the use of a hold button.

The specific embodiment disclosed herein is intended to be merely illustrative and not restrictive of the invention since various circuit modifications readily apparent to those familiar with the art can be made without detracting from the scope and spirit of the invention as claimed hereinbelow.

What is claimed is:

1. In combination with a private switching exchange for interconnecting private intercom stations and a key telephone system having a key telephone set and a plurality of telephone lines, each telephone line being connected to the key telephone set through an individual line circuit when an associated telephone line pickup button on the set is operated and temporarily disconnected from the set in response to a hold signal applied to the line circuit, a transfer adapter arrangement for extending at least one of the telephone lines to a selected one of a plurality of the intercom stations, comprising at least one transfer adapter circuit means connected between the key telephone set and the line circuit of the telephone line to be extended and being connected to the private switching exchange through an intercom line, said transfer adapter circuit means being responsive to transfer signals from the key telephone set when the associated telephone line pickup button is operated, said transfer adapter circuit means responding to a first transfer signal by applying a hold signal to its associated line circuit and connecting the key telephone set to the intercom line for interconnecting the key telephone set and the selected intercom station through the private switching exchange, and responding to a second transfer signal after the key telephone set is connected to the selected intercom station by removing the hold signal and connecting the telephone line to the key telephone set and the selected intercom station.

2. The transfer adapter arrangement of claim 1 wherein after the key telephone set and the intercom station are interconnected, the hold signal is removed and the telephone line is connected to the intercom station when the key set is disconnected from the transfer adapter circuit.

3. The transfer adapter arrangement of claim 2 wherein the intercom line is connected to the telephone line and the key telephone set through an audio bridge circuit for passing audio signals therebetween, said bridge circuit being connected when the intercom line is connected to an intercom station through the private switching exchange.

4. The transfer adapter arrangement of claim 2 including a plurality of transfer adapter circuit means, each adapter circuit means being connected between the key telephone set and a different line circuit and being connected to the private switching exchange through an individual intercom line.

5. The combination with a private switching exchange for interconnecting private intercom stations and a key telephone system having a key telephone set and a plurality of telephone lines, each telephone line being connected to the telephone set via an individual audio lead pair of the telephone set through an individual line circuit when an associated telephone line pickup button on the set is operated and being temporarily disconnected from the telephone set after a hold signal is applied to the line circuit via a signal lead from the telephone set, a transfer adapter arrangement for extending at least one telephone line to a selected one of a plurality of the intercom stations through the private switching exchange, comprising at least one transfer adapter circuit connected between the key telephone set and the line circuit of the telephone line to be extended and being connected to the private exchange through an intercom line, said transfer adapter circuit responding to transfer signals over the signal lead when the pickup button of its associated telephone line is operated and including first circuit means for applying a hold signal to its associated line circuit in response to a first transfer signal and for thereafter removing the hold signal when a second transfer signal is applied or the key set is disconnected from the transfer adapter circuit, second circuit means for disconnecting the key telephone set audio lead pair from the telephone line and connecting the lead pair to the intercom line after the first transfer signal is applied and for thereafter disconnecting the audio lead pair from the intercom line and reconnecting it to the telephone line when the second transfer signal is applied or the key set is disconnected from the transfer adapter circuit, and third circuit means connected between the audio lead pair and the intercom line for providing an audio path between the intercom and telephone lines in response to a signal from the private switching exchange indicating that the intercom line is connected through the private switching exchange to the selected intercom station.

6. The transfer adapter arrangement of claim 5 wherein said second circuit means includes a relay which is actuated after the first transfer signal until either the second transfer signal is applied or the key set is disconnected from the telephone line and normally open contacts of said relay connected in series with the intercom line and normally closed contacts of said relay connected in series with the telephone line.

7. The transfer adapter arrangement of claim 5 wherein said third circuit means includes a relay responsive to the signal from the exchange indicating that the intercom line is connected to the selected intercom station and a repeater bridge having one pair of series windings connected through normally open contacts of said relay across the intercom line and the other pair of series windings connected through other normally open contacts of said relay across the audio lead pair.

8. The transfer adapter arrangement of claim 5 wherein the key telephone set has a nonlocking transfer key which causes a transfer signal to be applied to the connected signal lead whenever the key is depressed.

9. The transfer adapter arrangement of claim 5 including a plurality of transfer adapter circuits, each being connected between the key telephone set and a different line circuit and being connected to the private exchange.

10. The transfer adapter arrangement of claim 9 including an inhibit circuit connected between the private switching exchange and all of the transfer adapter circuits for inhibiting all of the idle transfer adapter circuits when signals from the private switching exchange indicate that a preselected number of adapter circuits are already actuated.

11. A transfer adapter circuit respectively connecting the audio pair and signal leads from a key telephone set to the telephone line and signal leads from a line circuit which is responsive to the removal of an off-hook signal from the key set via the signal lead for placing the associated telephone line on hold, for extending the telephone line to any one of a group of intercom stations via an intercom line connected between the transfer adapter circuit and a private switching exchange used for interconnecting the intercom stations, the line being extended in response to transfer signals from the key telephone set via the signal lead, the off-hook signal being always present on the signal lead whenever the key set is connected to the transfer adapter circuit and a transfer signal is not present, comprising:

four relays;

first circuit means for actuating a first one of said four relays through normally closed contacts of a second and a third one of said four relays in response to the first transfer signal;

second circuit means responsive to the actuation of said first relay for momentarily energizing said second relay when said first relay is released;

third circuit means for energizing said second relay through normally open contacts of said second relay and normally closed contacts of said third relay in response to the off-hook signal;

fourth circuit means for actuating said third relay in response to the second transfer signal;

circuit means for connecting the fourth one of said four relays to the private switching exchange for actuating said fourth relay in response to a signal from the exchange when the intercom line is connected to an intercom station;

normally closed contacts of said first and second relays connected in series with the signal lead to the line circuit;

normally open contacts of said fourth relay for applying an off-hook signal to the line circuit through the normally closed contacts of said first and second relays connected in series with the signal lead;

normally closed contacts of said second relay connected in series with the telephone line leads;

normally open contacts of said second relay connected in series with the intercom line, the intercom line being connected to the audio lead pair, and audio bridge circuit means for providing an audio path between the intercom line and the audio lead pair when said fourth relay is actuated.

12. The transfer adapter circuit of claim 11 wherein said second relay is a dual coil relay and said second circuit means, includes a capacitor connected in series with a winding of said dual coil relay through which energizing current flows.

13. The transfer adapter circuit of claim 12 wherein said audio bridge circuit means includes a repeater bridge having one pair of series windings connected across the intercom line and the other pair of series windings connected across the audio lead pair.

* * * * *